(12) United States Patent
Spencer et al.

(10) Patent No.: US 8,489,123 B2
(45) Date of Patent: Jul. 16, 2013

(54) APPARATUS AND METHOD FOR DERIVING POSITION INFORMATION

(75) Inventors: Adrian G. Spencer, Worcester (GB); Said Moridi, London (GB)

(73) Assignee: St-Ericsson SA, Plan-les-Ouates (CH)

( * ) Notice: Subject to any disclaimer, the term of this patent is extended or adjusted under 35 U.S.C. 154(b) by 635 days.

(21) Appl. No.: 11/719,745

(22) PCT Filed: Nov. 7, 2005

(86) PCT No.: PCT/IB2005/053641
§ 371 (c)(1),
(2), (4) Date: May 27, 2009

(87) PCT Pub. No.: WO2006/054196
PCT Pub. Date: May 26, 2006

(65) Prior Publication Data
US 2009/0239548 A1    Sep. 24, 2009

(30) Foreign Application Priority Data
Nov. 18, 2004    (GB) .................................. 0425401.7

(51) Int. Cl.
H04W 24/00    (2009.01)
H04J 3/00    (2006.01)
H04B 7/212    (2006.01)
H04B 1/00    (2006.01)

(52) U.S. Cl.
USPC ..................... 455/456.6; 455/456.1; 375/137; 375/150; 370/336; 370/337; 370/347

(58) Field of Classification Search
USPC ......... 375/316, 350, 134, 136–137, 140–145, 375/148–150; 455/12.1, 13.1, 15–16, 18, 455/67.11, 67.16, 133–135, 137, 229, 404.2, 455/418–420, 427, 431, 456.1–456.6, 457, 455/550.1, 556.2, 560–561; 370/330, 336–337, 370/347, 458–459; 342/108, 145–146, 189, 342/352, 357.2, 357.359, 357.63, 357.69, 342/380–381, 383–384, 450
See application file for complete search history.

(56) References Cited

U.S. PATENT DOCUMENTS

| | | | |
|---|---|---|---|
| 5,301,368 A | 4/1994 | Hirata | |
| 5,982,324 A | 11/1999 | Watters et al. | |
| 6,107,960 A | 8/2000 | Krasner | |
| 6,389,291 B1 * | 5/2002 | Pande et al. ................ | 455/456.5 |
| 6,466,163 B2 | 10/2002 | Naruse et al. | |

(Continued)

FOREIGN PATENT DOCUMENTS

WO    99/36795    7/1999
WO    2004/100389 A2    11/2004

*Primary Examiner* — Meless Zewdu
(74) *Attorney, Agent, or Firm* — Potomac Patent Group PLLC (57) ABSTRACT

A wireless receiver for receiving signals from a satellite positioning system, and receiving signals from a communications system uses a common path in the receiver, and derives position information (60, 230) from the received signals by correlation (50, 210, 220) with a code. In a first mode the deriving is carried out from the received signals excluding selected signals received in time slots used for communications signals. A second mode includes such signals. This enables control of the trade off between accuracy and the latency of the positioning processor to improve the performance over a range of conditions. The mode input can be changed dynamically according to signal strength, or according to the needs of an application.

20 Claims, 8 Drawing Sheets

U.S. PATENT DOCUMENTS

| | | |
|---|---|---|
| 6,529,493 B1 | 3/2003 | Varin |
| 162,549 A1 | 8/2003 | Carlsson |
| 6,831,911 B1 * | 12/2004 | Sridharan et al. ............. 370/345 |
| 7,321,610 B2 * | 1/2008 | Lu ................................. 375/148 |
| 2002/0107033 A1 | 8/2002 | Kim |
| 2003/0162549 A1 | 8/2003 | Carlsson |
| 2005/0117631 A1 * | 6/2005 | Nakada ......................... 375/148 |
| 2005/0153730 A1 * | 7/2005 | Turetzky et al. ............ 455/550.1 |
| 2006/0030356 A1 * | 2/2006 | Haub et al. ................. 455/553.1 |

* cited by examiner

APPARATUS AND METHOD FOR DERIVING POSITION INFORMATION

This invention relates to apparatus for receiving signals from a positioning system, to a wireless transceiver having such apparatus, to integrated circuits, and to corresponding methods.

It is known to try to obtain a position or location of a mobile handset such as a mobile phone, typically by determining distances from base stations or from GPS (Global Positioning System) satellites, by detecting transmission delays, and triangulating from the distances. GPS transmits data from satellites to user equipment, using spread-spectrum techniques to help overcome the extremely low signal power caused by the long ranges involved. This data is correlated with a locally-generated copy of the spreading code, to obtain a peak at a given time delay. This is used to determine a delay from a known clock reference, representing a transmission delay. This is converted to a range measurement, and is determined for a number of satellites. With four or more of these measurements, a position-fix may be made, i.e. an indication of the location of the receiver.

The FCC in the USA has decreed that when an emergency call is made from a mobile telephone, it should be locatable "within 50 to 100 meters in most cases". It is known to produce CDMA2000 mobile handsets which have GPS functionality (CDMA2000 is a mobile standard used in North America). The CDMA2000 system uses full-duplex frequency-division multiplex (FDM) where transmit and receive frequencies are separate, and both can happen simultaneously.

In many parts of the world (including America) the Global System for Mobile Communication (GSM) is (also) used widely. In this system transmission and reception of data do not occur at the same instant in a mobile handset, i.e. they are time-division multiplexed (TDM). Each handset linked to a base-station will receive for one time-slot (of 8), transmit for one, and monitor adjacent frequencies for half a slot. This TDM structure enables GPS data to be acquired in the 'quiet' intervals between transmission and reception of GSM data.

As discussed in U.S. Pat. No. 6,529,493, it is known to have two independent terminals in a single housing, specifically a radio telecommunications terminal (e.g. a GSM terminal) and a positioning terminal (e.g. a GPS terminal). This is significantly more expensive than a single telecommunications terminal, as there are two RF receivers and two baseband processors. A second known technique sets out to remedy that drawback, by using a common or shared baseband processing unit. This is time-shared between the system for receiving positioning signals (operation in positioning mode) and the transceiver system for telecommunications signals (operation in telecommunications mode). The terminal includes switching means enabling one or other of its two operating modes to be selected (positioning or telecommunications) by a user. However this is unable to operate positioning and telecommunications modes simultaneously.

U.S. Pat. No. 6,529,493 proposes simultaneous operation by taking advantage of the moments of inactivity of the means for transmitting and receiving telecommunications signals in order to perform positioning measurements. In a TDM system such as a GSM system having sequences of 8 time slots, a first slot is used for transmitting, two slots are left clear, a fourth slot is used for receiving GSM signals, and the fifth, sixth, seventh and eighth slots are used for receiving and processing GPS signals.

It is also known from US patent application 2003/0162549 that mobile handset positioning is limited by the processing time available for positioning calculations. This is especially so for handsets such as GPRS (Generalised Packet RadioService) handsets capable of higher data rates, which leave less "free" time available for positioning operations. To address this, it is proposed that the mobile station can request additional "idle" blocks or frames from the network, to enable it to complete a positioning operation more quickly. In one embodiment applicable to GPRS networks, mobile stations operating in packet data mode request additional "idle" blocks or frames from the network, if required to perform a positioning operation more quickly than the default number of idle frames permits. A given mobile station might receive a request indicating a desired positioning operation and the desired time for completing that operation, and then determine that the amount of background processing time currently available to it is insufficient. If so, the mobile station transmits a request for the number of idle frames it needs to timely complete the positioning operation. Upon receiving this request, the network determines whether, for example, its ongoing user scheduling operations will permit it to honour the request for additional idle time. If not, the network sends a response message indicating denial of the request. In that instance, the mobile station might respond with an error message indicating that it cannot perform the requested positioning operation within the desired time.

If the request is granted, the network generally determines the specific allocation of additional idle time. That is, the network determines how best to allocate additional idle frames in one or more forthcoming TDMA frames, such that the mobile station receives the requested amount of additional idle time. By interleaving the additional idle time into subsequent sets of active TDMA frames, the network enables the mobile station to perform the requested positioning operation without disrupting ongoing communication.

If the request was not granted, or if the request granted insufficient additional idle time, the mobile station may return an error message, or perform abbreviated processing and return a less accurate or less complete result, or may perform full processing but return the result at a time later than specified by the request.

There remains a need for improved handling of such GPS signals.

It is an object of the invention to provide improved apparatus or methods.

According to a first aspect of the invention, there is provided an apparatus for use in a wireless receiver for receiving signals from a positioning system, and receiving signals from a communications system using a common path in the receiver, the apparatus having a position processor arranged to derive position information from the received signals, the position processor having a first mode in which the deriving is carried out from the received signals excluding selected signals received in time slots being used for communications signals, and a second mode including such signals, the mode being controlled according to a mode input.

The invention enables control of the trade off between accuracy and the latency of the positioning processor. This can improve the performance over a range of conditions. In some cases the accuracy will not be badly affected by including some signals dominated by communications signals, and it is not necessary to delay the processing by waiting for more periods when there is no communications signal. In other cases the accuracy may be impaired too much. Compared to the above mentioned US patent application 2003/0162549, this represents a different approach which can avoid the delay of asking the network for idle time, and can avoid adding to the complexity of existing network management software.

Or, it can be used to complement the approach of US patent application 2003/0162549.

An additional feature for a dependent claim is a means for deriving the mode input according to a characteristic of the received signals of the positioning system. This can enable the accuracy or latency to be improved if the signal is strong for example, or improve the accuracy at the expense of latency if the signal is weak.

Another such additional feature is an input from a higher level application which uses the position information, and means for deriving the mode input according to this application input. This can enable the application to influence the accuracy or latency for example. This application can be located in the receiver or remotely in the network or elsewhere.

Another such additional feature is the means for deriving the mode input being arranged to alter the mode input dynamically. This can enable better adaptation than setting the mode to a fixed value for a period of processing.

Another such additional feature is the positioning system being satellite based. These tend to have weaker signals than terrestrial positioning systems.

Another such additional feature is the processor comprising a correlator for correlating the received signal with a predetermined sequence to determine a transmission delay of the received signals.

Another such additional feature is the processor comprising a means for determining the signal characteristic from an output of the correlator. This can encompass a signal strength, a signal to noise ratio, or other characteristic.

Another such feature is the means for deriving the mode input comprising a comparator for comparing the signal characteristic to a threshold.

Another such additional feature is the mode being changed by controlling the correlator according to the mode input. This can be simpler than alternatives such as selecting signals before they reach the correlator.

Another such additional feature is the positioning processor being arranged to determine an average of more than one correlation output, from signals received in non-consecutive time slots, and determine a distance value from the average. This helps enable more values to be averaged, and thus improve accuracy, without having to wait for a long "idle" period of the communications system (see above mentioned US 2003/0162549.

Another such additional feature is the communications system comprising a time division multiplex system, the means for deriving the mode signal being synchronised to time slots of the communications system.

Another such additional feature is the position processor being arranged to store received signals for post processing.

Another such additional feature is the apparatus being implemented as an integrated circuit.

Another aspect provides a wireless transceiver comprising an antenna, a shared RF path and the apparatus.

An additional feature is a second antenna, separate RF paths for the communications signals and for the position system signals and a combiner for combining them onto the shared path. This can enable the separate RF paths to be optimised for different bands.

Another aspect provides a mobile battery powered device having the wireless transceiver.

Any of the additional features can be combined together or with any of the aspects of the invention, as would be apparent to those skilled in the art. Other advantages may be apparent to those skilled in the art, especially over other prior art not known to the inventors.

Embodiments of the invention will now be described by way of example, and with reference to the accompanying drawings, in which.

The embodiments involve two modes of operation. The received GPS data will contain 'gaps', during the periods when the radio is receiving GSM data, which will lead to a decrease in sensitivity, and resulting decrease in accuracy of the estimation of the user's position. However, acquiring the GPS data in this first mode (including GSM slots) leads to the position 'fix' being obtained in the minimum time.

A second mode (excluding GSM slots) is as follows: During the periods that the handset is receiving GSM data, when the GPS data is known to be corrupt, the de-spreading of the GPS signal may be stopped, and re-commenced at the next instant that the data is 'good'. The pieces of 'good' data may then be sequenced, so the correlation will be done only with good data. There will therefore be no decrease in sensitivity but a longer elapsed time to obtain a fix: (a factor of 2⅝ longer in one example). When recommencing, alignment of the spreading code should be maintained. This can be achieved in various ways, as would be apparent to those skilled in the art.

Either of these two modes may be used, or a proportion of both; depending on the time-to-fix and sensitivity level required, and local conditions.

Figure 1:
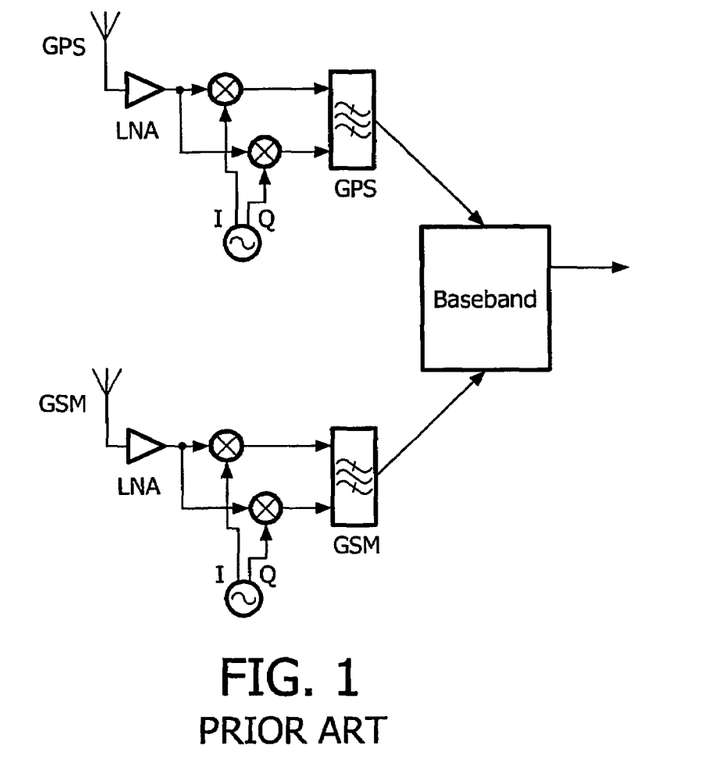
FIGS. 1 to 3 show known arrangements to which embodiments of the invention can be applied.

FIG. 1 shows a known arrangement of a wireless receiver in which the modes can be used. Separate RF paths are provided for GPS and GSM signals, in the form of separate antennas, low noise amplifiers (LNA), and quadrature (IQ) demodulators and band filters. The two separate paths are fed into a common baseband processing part. Hence there is a common path only at this stage. The two modes of the embodiments, involving sharing the timeslots, take place in the baseband processing part and will be described below.

Figure 2:
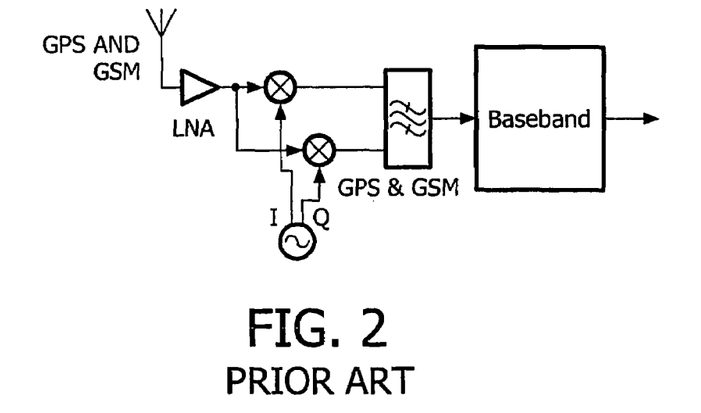

FIG. 2 shows another example. In this case there is a common RF path from the antenna to the baseband processing part. The band filter and all the parts in the path need to be able to handle the different bands used by the GSM and GPS signals. In other examples, the communication signals and positioning signals can share the same band.

Figure 3:
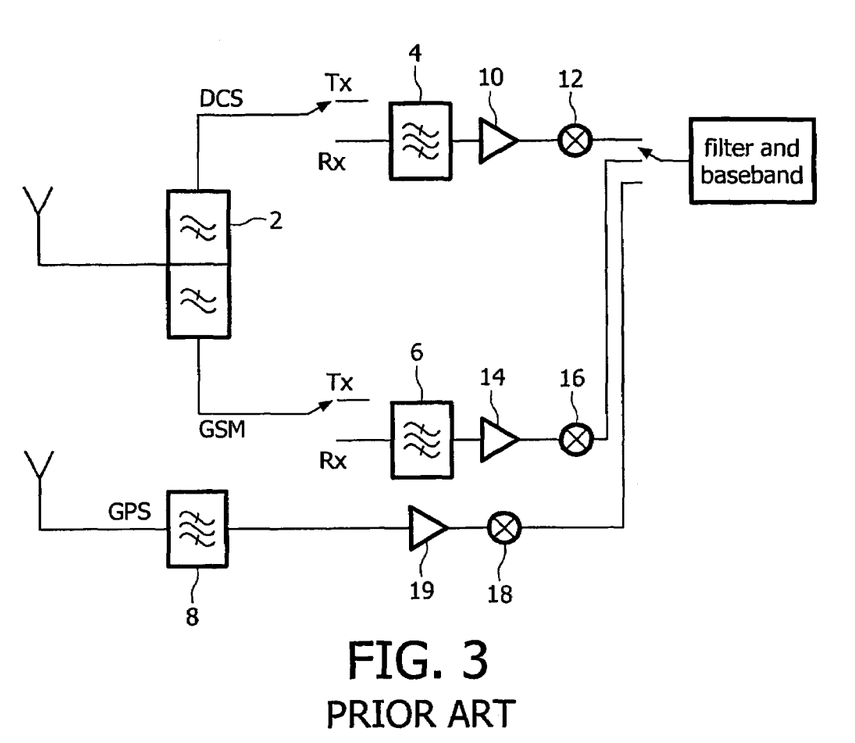

FIG. 3 shows an implementation where the GPS path is separate until the intermediate frequency (IF), where a reconfigurable channel filter is used to filter out unwanted interfering signals from the GPS and GSM signals. The GPS bandwidth may be 1, 2 or 4 MHz; GSM is 200 kHz. This can be implemented by a polyphase filter or other type of filter as would be apparent to those skilled in the art. Processing after the channel filter would typically be digital and common to GPS and GSM.

In FIG. 3 there is a common antenna for the GSM and the Digital Communication System (DCS) frequency bands, but separate RF paths for these bands until the filter and baseband part. A separate antenna is provided for GPS signals as before. A first filter 2 separates the GSM and DCS signals. For each path, this is followed by a switch to separate Rx and Tx paths. For clarity, the transmit circuitry is not shown in FIG. 3. This is followed by a band filter 4,6 and then an amplifier 10, 14 and demodulator part 12, 16. For the GPS path, a filter 8 is followed by an amplifier 19 and demodulator part 18. All three paths are fed to the common filter and baseband part, which is time shared.

Figure 4:
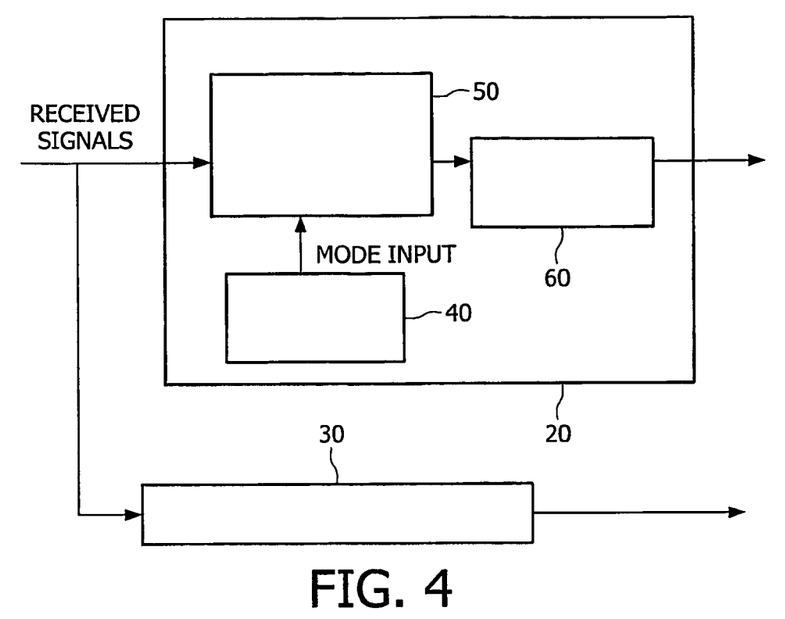
FIG. 4 shows a first embodiment of the invention, for the baseband processing part of FIGS. 1 to 3 or in other applications.

FIG. 4 shows an embodiment of the invention to show an example of the apparatus for processing the baseband signals, using the modes discussed above. A position processor 20 and a communications system processor 30 are shown coupled in parallel, though this could also represent time sharing of a common processor. The position processor 20 has a distance derivation part 50 with including and excluding modes. The mode is set by a mode input which is fed by a mode input generator 40. There are various ways of determining which mode to use. The derived distances are fed to a position derivation part 60 for deriving the position following established principles.

Figure 5:
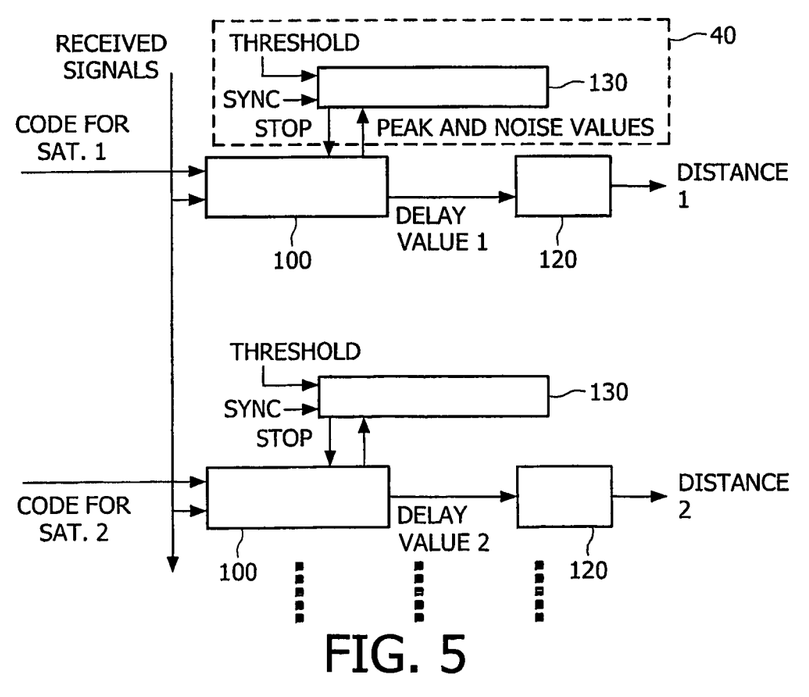
FIG. 5 shows another embodiment, for the distance derivation part of FIG. 4 or other applications.

FIG. 5 shows an example of how the distance derivation part 50 and mode input generator 40 can be implemented for a spread spectrum type positioning system such as GPS. Other examples can be conceived. The received signals are fed to a correlator 100, and compared to a predetermined code for a first beacon or satellite. If a peak in the correlation is found for a given relative delay value, this delay is output as an indication of a transmission delay and therefore distance from the satellite. An averager 120 builds up an average over time, to reduce the effect of noise.

A number of correlators 100 are typically provided, to simultaneously correlate the same received signals with codes for other beacons of satellites. Thus delay value 2 can be generated, leading to averaged distance value 2 and so on.

If the arrangement is operated in an including mode, the correlators 100 are operated continuously, even if communications signals are being received, with no positioning information. If the arrangement is operated in an excluding mode, then the correlators 100 are stopped when there is a time slot containing non positioning signals. The mode input to decide whether to stop the correlator is determined in this case from a signal strength indication. So the mode input generator 40 is implemented in the form of a comparator 130, arranged to compare a peak from the correlator 100 with a threshold. It may also take into account a noise level, and other factors to determine whether to stop the correlator 100. The mode can be set to a predetermined mode, or dynamically altered as the conditions, e.g. signal strength changes. The mode can also be set by an application which will use the position information. This could be for example an application running locally on the receiver, or an application running remotely. Examples include an emergency call location finder application run by the network when it receives an emergency call, or a route finding application run by a user of the wireless transceiver. Restart of the correlator 100 can be synchronised to ensure alignment is maintained, or a relative delay inserted between the inputs, to ensure correct alignment.

Figure 6:
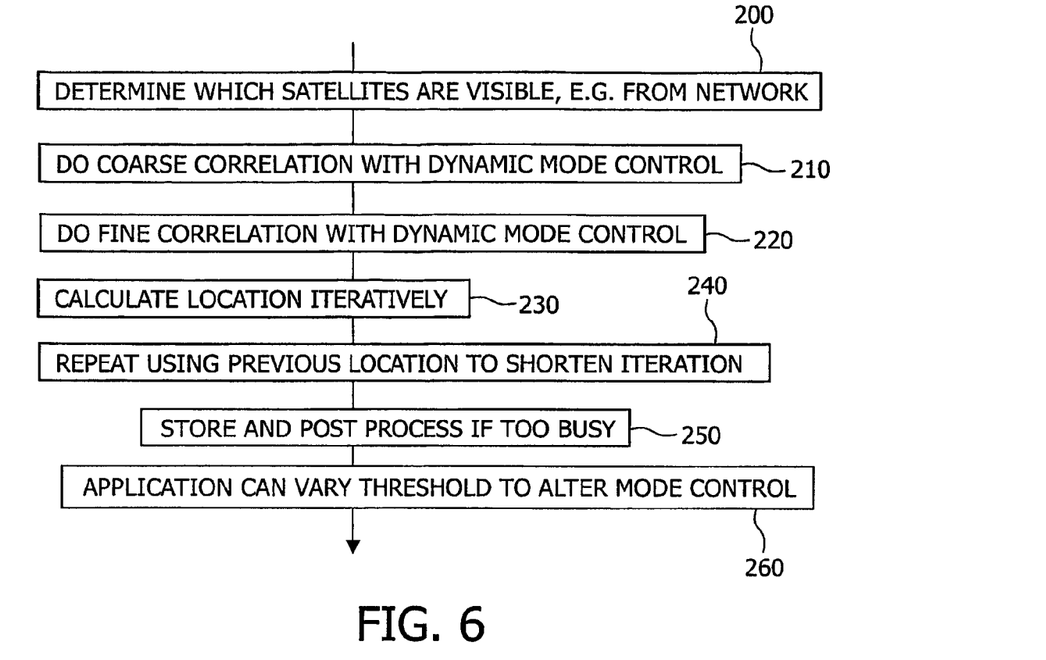
FIG. 6 shows a flow chart of an embodiment.

FIG. 6 shows a flow chart according to an embodiment. At step 200 the receiver determines which satellites are visible, e.g. by obtaining information from the communications network. At step 210, a coarse correlation is carried out with dynamic mode control as described above. Once an approximate distance is found, a finer correlation over a smaller range of delays can be run at step 220, again with dynamic mode control. At step 230, the location is calculated typically using an iterative algorithm. At step 240, these steps can be repeated, and the iteration can be shortened by starting from the previous location value. Optional steps 250 and 260 can be carried out at any time, to store and post process the signals if the processor 20 is too busy for example. At step 260 the application can vary the threshold or alter the mode directly, as required by the needs of the application for low latency or more accuracy.

Figure 7:
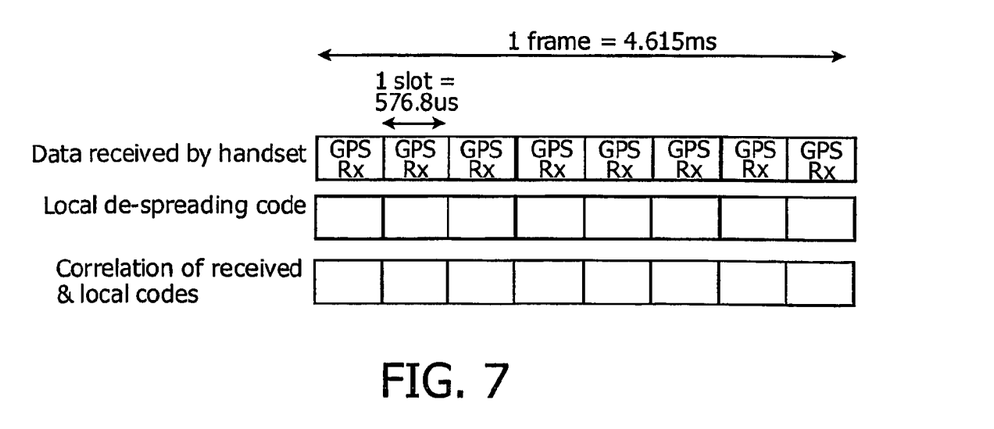
FIG. 7 shows a time slot chart where all slots receive GPS signals.
Figure 8:
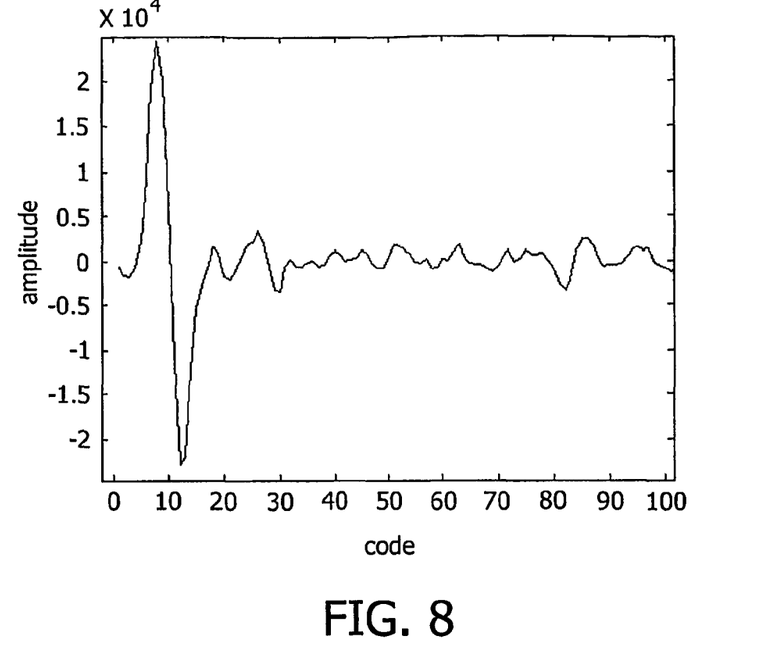
FIG. 8 shows a correlation graph for the case of FIG. 7.

FIG. 7 shows a time slot diagram for a GSM frame. With all 8 slots available for GPS operation, i.e. GSM is not operational, the situation is as illustrated in FIG. 7. The received data has no gaps due to GSM operation of the receiver, the local code is generated continuously, and the resulting correlation of these two has no gaps. Typically, for a 10 ms integration time (i.e. just over two GSM time-frames) the early-late peak compared to the noise is as shown in FIG. 8.

Including Mode

Figure 9:
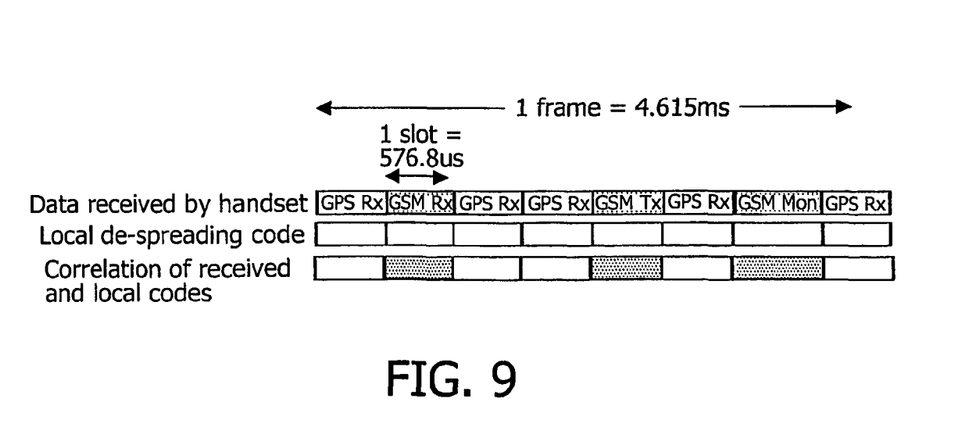
FIG. 9 shows a time slot chart where some slots receive GSM signals, but they are all included in the GPS processing.
Figure 10:
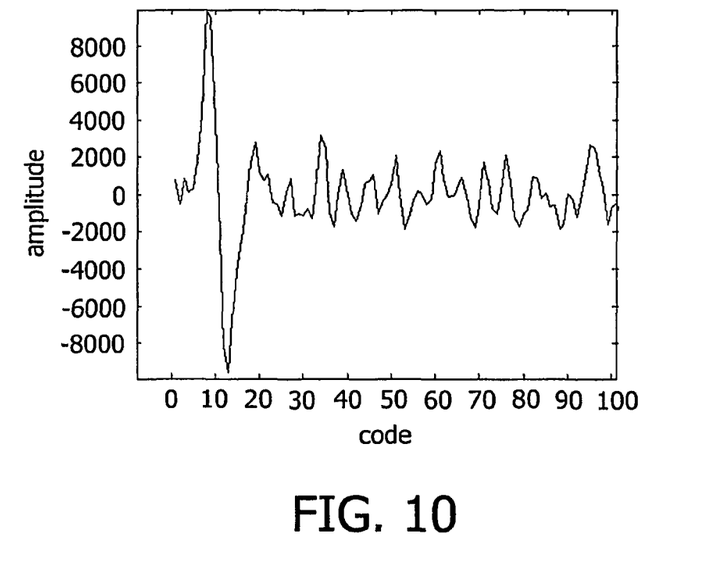
FIG. 10 shows a correlation graph for the case of FIG. 9.

For the situation where the handset is operating in GSM mode for some of the time-slots, the correlation of the received data with the locally-generated code is subject to periods where zero correlation occurs, represented in FIG. 9 below by the shaded time slots. The resulting amplitude of the early minus late peak is reduced, compared to the noise, as shown in FIG. 10. This means that the sensitivity of the receiver is effectively compromised, as the early minus late peak is required to lock-on to the received signal and its amplitude is proportional to the accuracy of the position-fix that the device makes.

Figure 11:
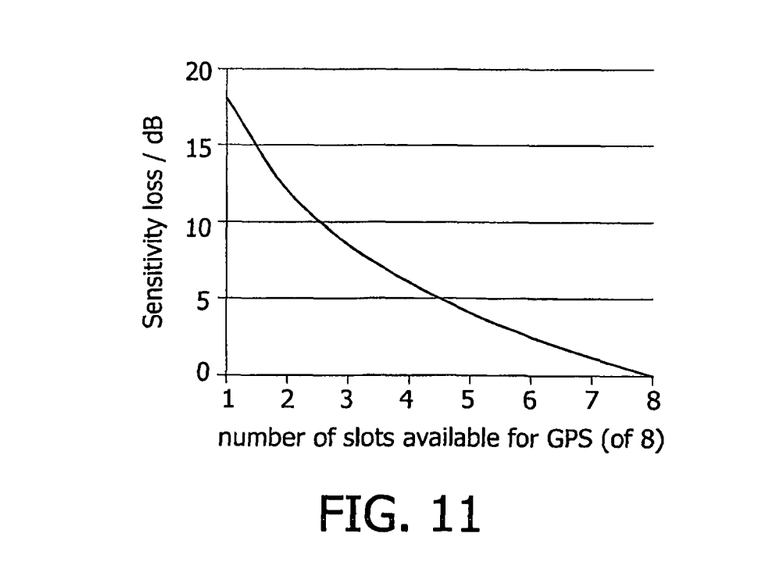
FIG. 11 shows a graph of sensitivity loss versus slot availability.
Figure 12:
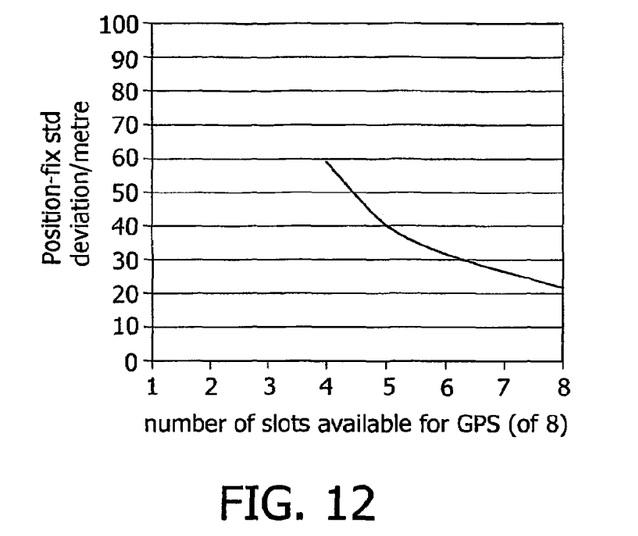
FIG. 12 shows a graph of position fix versus slot availability at −130 dB and for 100 ms correlation.

The increase in the minimum useable signal strength for a given receiver is given by:

$$A = 20\log\frac{total\_slots}{GPS\_slots\_usable}$$

where total_slots=8, and $1 \leq GPS\_slots\_usable \leq 8$. Hence for 5 slots useable for GPS the minimum useable signal is increased by 4 dB. This is depicted in FIG. 11. There is a correlation between loss of sensitivity and increasing uncertainty in the position-fix. This depends on the code phase-locked loop parameters, which detect the zero crossings of the early minus late correlation shown in FIG. 8 and FIG. 10. Experimental results are shown in FIG. 12 and Table 1 rows 2 to 5, together with theoretical results in rows 6 and 7. In Table 1, HDOP refers to "horizontal dilution of precision" which is a term used in the art and which indicates how accurate a position fix is (the smaller the better).

TABLE 1

Position-fix standard deviation versus slot availability

| | Slots available for GPS use (of 8) | | | | |
|---|---|---|---|---|---|
| | 8 | 7 | 6 | 5 | 4 |
| Pseudorange mean distance (metre) | 591 | 593 | 594 | 593 | 591 |
| Pseudorange std deviation (metre) | 6.4 | 8.2 | 10.05 | 13 | 19.4 |
| Position-fix std deviation (metre) | 19.2 | 24.6 | 30.15 | 39 | 58.2 |
| Position-fix std deviation (metre) with HDOP error added | 21.7 | 26.6 | 31.8 | 40.3 | 59.1 |
| Position-fix Std dev (theory) (metre) | 19.95 | 22.8 | 26.4 | 31.8 | 39.9 |
| Position-fix std dev (theory) (metre) with HDOP error added | 22.4 | 25.0 | 28.3 | 33.4 | 41.2 |

Figure 13:
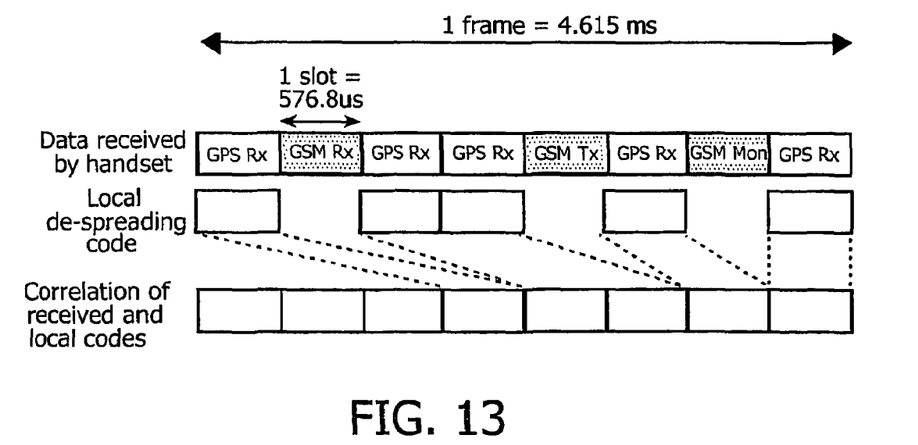
FIG. 13 shows a time slot chart where some slots receive GSM signals, and the GSM slots are not included in the GPS processing.

Excluding Mode:

FIG. 13 shows a frame of GSM timeslots and uses correlation of received signals excluding some slots. The technique of excluding timeslots can give the performance shown in FIG. 8 but with only 5 "good" slots available in the example illustrated (this number of slots can vary from 1 to 7 inclusive). During the periods that the handset is receiving GSM data, when the GPS data is known to be corrupt, the generation of the local-copy of the spreading code GPS may be stopped, and re-commenced at the next instant that the received data is 'good'. The sections of 'good' data may then be sequenced as shown, so the correlation will be done only with good data. There will therefore be no decrease in sensitivity but as only 5 slots-worth of data are correlated in each frame (of 8 slots) a longer elapsed time is required to obtain a fix: (a factor of 8/5 longer).

Figure 14:
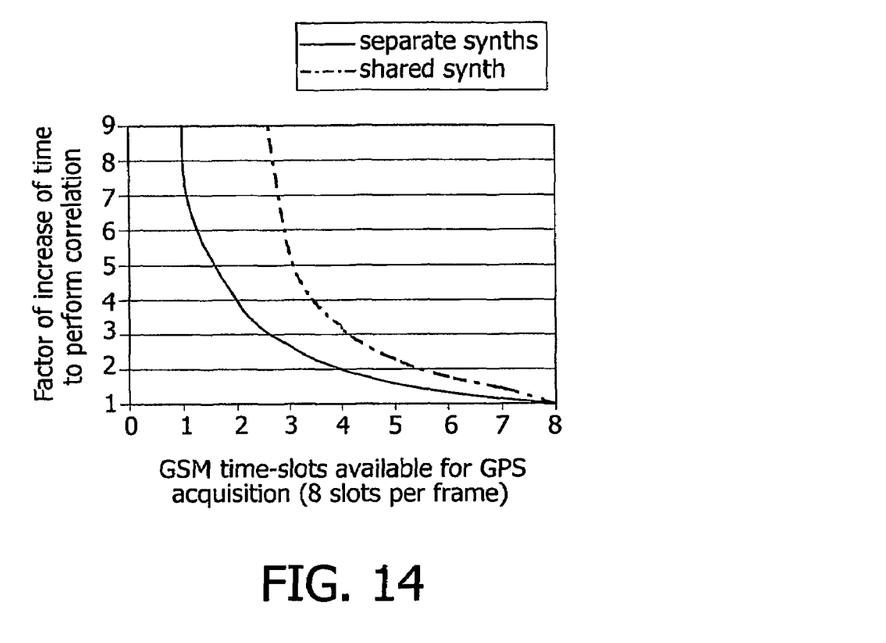
FIG. 14 shows a graph of time for sequential acquisition, versus slots available.

In practice, the data from the receiver could be stored in memory, and the correlation performed when sufficient data has been acquired. The length of time for the correlation to occur is illustrated in FIG. 14, normalised to the length of time required in a given signal strength for a particular position-fix accuracy. For example, in the case of 5 of the 8 slots in a GSM frame being available for GPS acquisition, and two synthesizers being deployed (one for GSM, one for GPS, so each synthesizer can be stable before it is required) the time taken to perform the correlation will be increased by a factor of 1.6 (8/5). If one synthesizer is used for both GSM and GPS, time is lost while the synthesizer settles (assumed to be 140 µs) and the time to perform the correlation increases to a factor of 2.3.

Implementation can be in the form of an integrated circuit. It could be in the same integrated circuit as a front end. For example it could be added to the Philips GSM chipset (by a modification to the UAA3537 RF front-end IC for example). It is applicable to any time division multiplexed communication system, including the 3rd generation system UMTS (Universal Mobile Telecommunication System) if 'compressed mode' is used. The addition of GPS to cellular handsets has already begun, location information is now required by the FCC from handsets in the USA, and is currently being finalised by the 3GPP (3rd Generation Partnership Program) organisation.

As has been described above, there is a changing of mode of reception between:
a) minimum time-to-fix and loss of sensitivity
b) best sensitivity and longer time-to-fix The determination of which one, or relative proportions of each, to use can be based on:
i) A signal noise ratio or received signal strength indication (RSSI) of the GPS signal. This signal is available soon after the start of reception, and may be used to update the relative proportion of a) or b) throughout a position-fix.
ii) The noise present following the correlation of the received code with the local code. This signal is also available soon after the start of reception, and may be used to the update the relative proportion of a) or b) throughout a position-fix.

Thresholds can be set to determine operation in mode a), b) or a combination of both. The combination of both could be used when some sensitivity could be compromised but the time to fix is important. The mode of operation could depend on local conditions, and may vary dynamically as the user moves in the environment. This exploits the gaps in the GSM time-division multiplex system to enable a mobile handset to have only one receiver, shared in time between GSM and GPS reception.

As discussed above, the embodiments relate to a radio receiver (e.g. in a mobile phone handset) which is able to receive Global System for Mobile Communications (GSM) data and Global Positioning System (GPS) data but not at the same instant, i.e. time-division multiplexed (TDM). The TDM structure enables GPS data to be acquired in the 'quiet' intervals between transmission and reception of GSM data. The received GPS data will have 'gaps' during the periods when the radio is receiving GSM data, which will lead to a decrease in sensitivity, and resulting decrease in accuracy of the estimation of the user's position. However, the position 'fix' is obtained in the minimum time.

An alternative to this is to stop the acquisition of GPS data during the periods when the radio is receiving GSM data. There will be no decrease in sensitivity but a longer elapsed time to obtain a fix. Either of these two modes may be used, or a proportion of both, depending on the time-to-fix and sensitivity level required.

As has been described above, a wireless receiver for receiving signals from a satellite positioning system, and receiving signals from a communications system uses a common path in the receiver, and derives position information from the received signals by correlation with a code. In a first mode the deriving is carried out from the received signals excluding selected signals received in time slots used for communications signals. A second mode includes such signals. This enables control of the trade off between accuracy and the latency of the positioning processor to improve the performance over a range of conditions. The mode input can be changed dynamically according to signal strength, or according to the needs of an application.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of positioning and the art of mobile communications and which may be used instead of or in addition to features already described herein.

The invention claimed is:

1. Apparatus for use in a wireless receiver for receiving signals from a positioning system and from a communications system using a common path in the receiver, the apparatus comprising a position processor arranged to derive position information from the received positioning system signals by correlating the received signals with a code, the position processor having two modes, a first mode in which the correlation excludes the signals received in time slots being used for receiving the communications system signals, and a second mode in which the correlation includes the signals received in the time slots being used for receiving the communications system signals, the mode being controlled according to a mode input.

2. The apparatus of claim 1 having a mode input generator for deriving the mode input according to a characteristic of the received positioning system signals.

3. The apparatus of claim 2, wherein the mode input generator comprises a comparator for comparing the signal characteristic to a threshold.

4. The apparatus of claim 1, having an input from a higher level application which uses the position information, and a mode input generator for deriving the mode input according to said input.

5. The apparatus of claim 4, wherein the mode input generator is arranged to dynamically alter the mode input.

6. The apparatus of claim 1, wherein the position processor comprises a correlator for correlating the received positioning system signals with the code to determine a transmission delay of the positioning system signals.

7. The apparatus of claim 6, arranged to change the mode by controlling the correlator according to the mode input.

8. The apparatus of claim 6, wherein the positioning processor is arranged to determine an average of more than one correlation output from positioning system signals received in non-consecutive time slots and to determine a distance value from the average.

9. The apparatus of claim 1, wherein the communications system comprises a time division multiplex system and the mode input is synchronized to time slots of the communications system.

10. The apparatus of claim 1, wherein the positioning system is a satellite based system.

11. The apparatus of claim 1, wherein the position processor is arranged to store the received positioning system signals for post processing.

12. The apparatus of claim 1 being implemented as one or more integrated circuits.

13. The apparatus of claim 2, wherein the position processor comprises a correlator for correlating the received positioning system signals with the code to determine a transmission delay of the received positioning system signals.

14. The apparatus of claim 13, wherein the position processor determines the signal characteristic from an output of the correlator.

15. The apparatus of claim 3, wherein the position processor comprises a correlator for correlating the received positioning system signals with the code to determine a transmission delay of the received positioning system signals.

16. The apparatus of claim 15, wherein the position processor determines the signal characteristic from an output of the correlator.

17. A wireless transceiver comprising an antenna, a shared RF path and the apparatus of claim 1.

18. The wireless transceiver of claim 17 having a second antenna, separate RF paths for the communications system signals and for the positioning system signals and a combiner for combining onto the shared path.

19. A mobile battery powered device having the wireless transceiver of claim 17.

20. A method of using a wireless receiver to receive signals from a positioning system and from a communications system, the method comprising:
deriving position information from the received positioning system signals by correlating the received signals with a code using two modes, a first mode in which the correlation excludes the signals received in time slots being used for receiving the communications system signals, and a second mode in which the correlation includes the signals including the positioning system signals received in the time slots being used for receiving the communications system signals, the mode being controlled according to a mode input.

* * * * *